AURELIUS V. PITTS.
No. 120,826. *Improved* Patented Nov. 14, 1871.

THRESHING MACHINE.

WITNESSES:
Eugene P. Moore
E. A. West

Aurelius V. Pitts
INVENTOR

UNITED STATES PATENT OFFICE.

AURELIUS V. PITTS, OF CHICAGO, ILLINOIS.

IMPROVEMENT IN THRASHING-MACHINES.

Specification forming part of Letters Patent No. 120,826, dated November 14, 1871; antedated October 27, 1871.

*To all whom it may concern:*

Be it known that I, AURELIUS V. PITTS, of the city of Chicago, in the county of Cook and State of Illinois, have invented certain new and useful Improvements in Thrashing-Machines, of which the following is a full description, reference being had to the accompanying drawing making a part of this specification, in which—

Figures 1, 2:
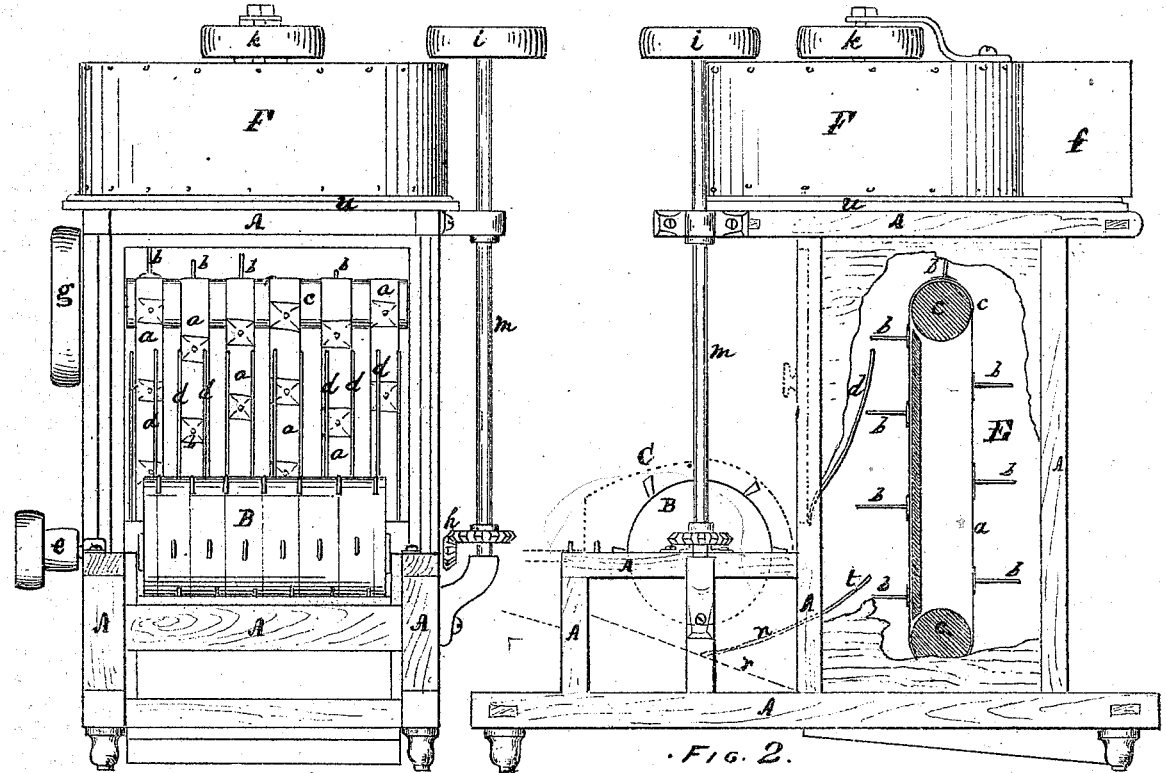
Figures 3, 4:
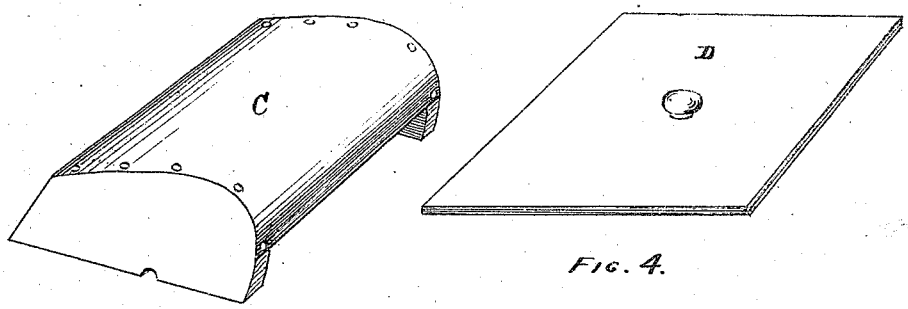

Figure 1 is a front elevation; Fig. 2, a side elevation, with a portion of the side cut away, showing the interior. Fig. 3 is the cover for the cylinder. Fig. 4 closes the front of the machine.

The principal object of my invention is to connect a fan with a thrashing-machine so that the straw will be thrown out by a suction-blast.

In the drawing, A represents the principal parts of the frame; B, the cylinder. F is the fan-case, within which is a fan of any suitable construction. This fan-case is so connected with the machine that it can be rotated to bring the outlet or mouth $f$ wherever desired, so that the straw can be blown out in any direction. $c\,c$ are two shafts, over which runs an endless apron, $a$, to which teeth or fingers $b$ are secured at suitable distances, say about six inches apart. This apron, as shown, consists of several separate bands; but I do not limit myself to this form of construction. The apron runs in a chamber having but two openings—one through which the straw passes from the cylinder to the apron, and through which air is drawn by the fan; the other at the top, through which the straw and air pass into the fan. These openings are not shown. The former should extend across the machine, and its top may be as high as the center of the cylinder; the other, at the top of the chamber, may be as large as the chamber itself. In Fig. 1, the front of this chamber is removed; it is seen in Fig. 4, D. In use, the cylinder is covered by C, Fig. 3. The grain to be thrashed is fed to the cylinder as usual, and the blast passes in where the grain is fed. $d$ are fingers within the chamber E, in front of the teeth $b$, behind which fingers the thrashed straw passes. These fingers are not absolutely necessary. The teeth $b$ help the blast to carry up the straw. Beneath the cylinder is another series of stationary fingers, $t$, occupying the place of the ordinary concave. I usually place them about three inches apart. Their position, relatively to the cylinder, is shown by the dotted line $n$. Beneath these fingers is a dividing board. Its position is indicated by the dotted line $r$. $h$ is a bevel-gearing, driven by the cylinder. Upon the top of the shaft $m$ is a pulley, $i$, from which, by a belt, the fan is driven by the pulley K. The endless apron is driven by a belt passing from $e$ to $g$.

The operation of this machine is as follows:

The grain is fed and thrashed as usual. When the straw and grain have passed through the cylinder the thrashed grain falls (or a portion of it) through the fingers $t$ upon the dividing-board, whence it passes onto a sieve beneath the chamber E, thence through the sieve out at the rear of the machine. At the same time, the fan being in operation, the straw is carried over the fingers into the chamber E, and up through the chamber into the fan, and out at the opening $f$. If any grain should be carried with the straw into the chamber, such grain, before the straw reaches the fan, falls onto the sieve at the bottom of the chamber, and will not be carried out through the fan. The force of the blast can be adjusted in the usual manner. Air will pass into the front of the machine, carrying with it all the dust, which, in ordinary machines, is so annoying and unhealthy, filling the lungs of the operator. Air will also pass into the chamber at the rear of the machine where the grain passes out, and all the straw, chaff, and dust will be carried into the fan.

A spout may be connected to the opening $f$, through which the straw will be carried to the top of the stack. In most cases the straw can be carried up through the chamber E by the force of the blast alone, without the aid of the teeth on the apron; but I deem it advisable to use the apron, especially when the straw is damp.

The fan may be located lower down, or even at the rear of the machine; but the separation of the grain from the straw is more likely to be complete when the straw is carried up vertically, or nearly so, a short distance, as in the machine represented.

A drum provided with teeth may be used instead of the apron $a$ having teeth as described; or rigid vertical strips, having teeth on them and operated by a crank, may be substituted for the apron and teeth; but the endless apron will be found the best.

The fan and case rest upon the top of the chamber E, and may be held in place by a circular piece, (or segments,) $u$, having a flange fitting into a groove near the lower edge of the case, but not fitting so tightly as to prevent the rotation of the fan and case, which can be held in any desired position by a set-screw or other suitable device. By this construction the straw can be thrown out in any direction, as may be rendered desirable by changes in the direction of the wind. This, with ordinary machines, can only be done by changing the position of the machine, which requires much time.

A machine constructed as described will not be as high as the ordinary thrashing-machine; it will be about eight feet long, while the ordinary machine is about sixteen feet long.

Other openings besides those described may be provided to admit air into the chamber E.

What I claim as new is as follows:

1. In combination with the cylinder B the adjustably-rotative fan-case F and its inclosed fan, when constructed and arranged for operation, substantially as described.

2. The fan-case F and its inclosed fan, thrashing-cylinder B, and endless apron $a$ provided with the prongs $b$, when combined and arranged to operate substantially as and for the purpose specified.

3. The combination and arrangement of the fan-case F and inclosed fan, apron $a$, cylinder B, and the fingers $t$, as described and shown.

4. In combination with a machine for thrashing grain, the fan-case F with its inclosed fan, when constructed to be removable, substantially in the manner and for the purpose specified.

AURELIUS V. PITTS.

Witnesses:
EUGENE P. MORSE,
E. A. WEST.                                (159)